US011882084B1

(12) United States Patent
Kalluri

(10) Patent No.: US 11,882,084 B1
(45) Date of Patent: *Jan. 23, 2024

(54) ENHANCED CHATBOT RESPONSES THROUGH MACHINE LEARNING

(71) Applicant: Wells Fargo Bank, N.A., San Francisco, CA (US)

(72) Inventor: Ravikant Kalluri, Chicago, IL (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/942,033

(22) Filed: Sep. 9, 2022

Related U.S. Application Data

(63) Continuation of application No. 16/714,559, filed on Dec. 13, 2019, now Pat. No. 11,444,893.

(51) Int. Cl.
| | |
|---|---|
| *H04L 51/02* | (2022.01) |
| *G06F 16/23* | (2019.01) |
| *G06N 20/00* | (2019.01) |
| *G10L 25/84* | (2013.01) |
| *G10L 15/06* | (2013.01) |
| *G10L 15/22* | (2006.01) |
| *G10L 13/00* | (2006.01) |

(52) U.S. Cl.
CPC .......... *H04L 51/02* (2013.01); *G06F 16/2379* (2019.01); *G06N 20/00* (2019.01); *G10L 13/00* (2013.01); *G10L 15/063* (2013.01); *G10L 15/22* (2013.01); *G10L 25/84* (2013.01)

(58) Field of Classification Search
CPC ..... H04L 51/02; G06F 16/2379; G06N 20/00; G10L 13/00; G10L 15/063; G10L 15/22; G10L 25/84
See application file for complete search history.

(56) References Cited

U.S. PATENT DOCUMENTS

| | | |
|---|---|---|
| 8,671,453 B2 | 3/2014 | Underwood et al. |
| 8,738,739 B2 | 5/2014 | Makar et al. |
| 8,751,042 B2 | 6/2014 | Lee et al. |
| 8,818,926 B2 | 8/2014 | Wallace |
| 9,552,350 B2 | 1/2017 | Brown et al. |
| 9,912,810 B2 | 3/2018 | Segre et al. |
| 10,038,787 B2 | 7/2018 | Tamblyn et al. |
| 10,102,846 B2 | 10/2018 | Braz et al. |

(Continued)

*Primary Examiner* — Hitesh Patel
*Assistant Examiner* — Vinh Nguyen
(74) *Attorney, Agent, or Firm* — Foley & Lardner LLP

(57) ABSTRACT

Disclosed are example machine-learning approaches for determining maturity metrics of chatbot users. One or more datasets with words used during past conversations between a chatbot and a set of users with known maturity metrics are generated. A machine learning model is trained by applying machine learning to the one or more datasets such that the machine learning model is trained to output maturity metrics based on words received as inputs. A set of words or phrases spoken or written by the user during a conversation is fed to the machine learning model to determine a maturity metric of the user. A response is identified based on the determined maturity metric, and the response is presented during the conversation with the user. Words and phrases of a user conversing with a chatbot are used to determine the user's age or another maturity metric to generate responses that enhance the user experience.

19 Claims, 9 Drawing Sheets

(56) References Cited

U.S. PATENT DOCUMENTS

| | | | |
|---|---|---|---|
| 10,226,866 B2 | 3/2019 | Thapliya | |
| 10,249,207 B2 | 4/2019 | Solomon et al. | |
| 10,335,954 B2 | 7/2019 | Monceaux et al. | |
| 10,388,285 B2 | 8/2019 | Hirzel et al. | |
| 10,573,298 B2 | 2/2020 | Anders et al. | |
| 11,005,997 B1 | 5/2021 | Deegan et al. | |
| 11,011,160 B1 | 5/2021 | Villaizan | |
| 11,048,979 B1 | 6/2021 | Zhdanov et al. | |
| 11,211,058 B1 | 12/2021 | Eakin et al. | |
| 11,461,849 B2* | 10/2022 | Loo | G06Q 40/08 |
| 11,599,900 B1* | 3/2023 | Melendez | G06Q 30/0236 |
| 2007/0074114 A1 | 3/2007 | Adjali et al. | |
| 2010/0153091 A1 | 6/2010 | Kung et al. | |
| 2012/0179633 A1 | 7/2012 | Ghani et al. | |
| 2013/0110792 A1 | 5/2013 | Hudis et al. | |
| 2013/0198039 A1 | 8/2013 | Sridharan et al. | |
| 2014/0032471 A1 | 1/2014 | Reddy et al. | |
| 2014/0122619 A1 | 5/2014 | Duan | |
| 2014/0244476 A1* | 8/2014 | Shvarts | G06Q 40/03 705/38 |
| 2014/0279050 A1 | 9/2014 | Makar et al. | |
| 2014/0288922 A1 | 9/2014 | Zha | |
| 2015/0134325 A1* | 5/2015 | Skiba | H04M 3/5233 704/9 |
| 2016/0253325 A1 | 9/2016 | Morley et al. | |
| 2017/0193558 A1* | 7/2017 | Lyons | G06F 18/28 |
| 2017/0245769 A1 | 8/2017 | Niehaus et al. | |
| 2017/0278181 A1* | 9/2017 | Shah | G06Q 40/00 |
| 2018/0075014 A1 | 3/2018 | Duan | |
| 2018/0089164 A1 | 3/2018 | Iida et al. | |
| 2018/0097815 A1* | 4/2018 | Wang | G06F 21/6218 |
| 2018/0108353 A1 | 4/2018 | Gustafson et al. | |
| 2018/0158069 A1 | 6/2018 | Sandei et al. | |
| 2018/0165554 A1 | 6/2018 | Zhang et al. | |
| 2018/0204133 A1 | 7/2018 | Cai et al. | |
| 2018/0232902 A1 | 8/2018 | Albadawi et al. | |
| 2018/0293483 A1 | 10/2018 | Abramson et al. | |
| 2018/0349583 A1* | 12/2018 | Turgeman | H04L 63/0861 |
| 2019/0005120 A1 | 1/2019 | Barbosa et al. | |
| 2019/0026836 A1 | 1/2019 | Milkovich et al. | |
| 2019/0130305 A1* | 5/2019 | Sivertson | G06N 5/01 |
| 2019/0130904 A1* | 5/2019 | Homma | G10L 15/18 |
| 2019/0180195 A1 | 6/2019 | Terry et al. | |
| 2019/0188583 A1 | 6/2019 | Appel et al. | |
| 2019/0188590 A1 | 6/2019 | Wu et al. | |
| 2019/0205381 A1 | 7/2019 | Raux et al. | |
| 2019/0224853 A1 | 7/2019 | Gewecke et al. | |
| 2019/0251959 A1 | 8/2019 | Engles et al. | |
| 2019/0274632 A1 | 9/2019 | Kochura et al. | |
| 2019/0325864 A1* | 10/2019 | Anders | G06F 40/56 |
| 2020/0042829 A1 | 2/2020 | Wang et al. | |
| 2020/0099633 A1* | 3/2020 | D'Agostino | G06F 3/0481 |
| 2020/0126533 A1 | 4/2020 | Doyle et al. | |
| 2020/0327200 A1 | 10/2020 | Lozon et al. | |
| 2020/0401659 A1 | 12/2020 | Lee et al. | |
| 2021/0117153 A1* | 4/2021 | Weinstein | G06F 40/109 |
| 2021/0142402 A1 | 5/2021 | Schlesinger et al. | |
| 2021/0157618 A1* | 5/2021 | Moon | H04L 51/02 |
| 2022/0046301 A1* | 2/2022 | Palczewski | H04N 21/2407 |

\* cited by examiner

ENHANCED CHATBOT RESPONSES THROUGH MACHINE LEARNING

CROSS-REFERENCE TO RELATED APPLICATIONS

This application is a continuation of U.S. patent application Ser. No. 16/714,559 filed Dec. 13, 2019, entitled "Enhanced Chatbot Responses During Conversations With Unknown Users Based On Maturity Metrics Determined From History Of Chatbot Interactions," incorporated herein by reference in its entirety.

TECHNICAL FIELD

The present disclosure relates generally to the use of machine learning or deep learning techniques to train models for determining maturity metrics of unknown users conversing with a chatbot based on, for example, terminology used (such as colloquialisms, idioms, slang terms, jargon, lingo) to provide improved responses and user experiences.

BACKGROUND

The age of a chatbot user can be important in determining suitable responses to the chatbot user during a conversation. However, the age of a user conversing with a chatbot is often not known to the chatbot. A user's age may help identify user preferences, wants, and needs based on the user's current stage of life and future goals to generate more suitable responses and enhance the user experience.

SUMMARY

Various embodiments of the disclosure relate to a method, which may be implemented by a machine learning platform comprising at least one computing system, of determining a maturity metric of a user. The method may comprise generating, by the computing system, one or more datasets comprising words used during past conversations between a chatbot and a plurality of users with known maturity metrics. The method may comprise training, by the computing system, a machine learning model by applying machine learning to the one or more datasets such that the machine learning model is trained to output maturity metrics based on words received as inputs. The method may comprise receiving, by the computing system, a set of words or phrases spoken or written by the user during a conversation. The method may comprise applying, by the computing system, the machine learning model to the set of words or phrases to determine a maturity metric of the user. The method may comprise generating, by the computing system, a response based on the determined maturity metric. The method may comprise perceptibly presenting, via the computing system, the response to the user during the conversation with the user.

Various embodiments of the disclosure relate to a computer-implemented method implemented by a machine learning platform. The method may comprise capturing, using a sound detector of a user device, ambient sounds during a conversation between a user and a chatbot. The method may comprise analyzing, by the user device, the ambient sounds to recognize a set of words spoken by the user during the conversation. The method may comprise applying a machine learning model to the set of words spoken by the user to determine an age or age range of the user, the machine learning model having been trained using past conversations between the chatbot and multiple other users with known ages, to determine user age based on words spoken by the plurality of users. The method may comprise generating, by the user device, a response based on the determined age or age range. The method may comprise instructing, by the user device, the chatbot to speak the response during the conversation.

Various embodiments of the disclosure relate to a computer-implemented method that may be implemented by a machine learning platform. The method may comprise determining, by a computing device and during a conversation with a user, that a maturity metric of the user is unknown. The method may comprise recognizing, by the computing device, words or phrases spoken or written by the user during the conversation. The method may comprise feeding, by the computing device, a subset of the words or phrases to a machine learning model trained to estimate maturity metrics based on which words or phrases are spoken or written by users. The method may comprise acquiring, by the computing device, a maturity metric output by the machine learning model. The method may comprise generating, by the computing device, a response suited to the maturity metric. The method may comprise audibly or visually presenting, by the computing device, the response to the user during the conversation.

These and other features, together with the organization and manner of operation thereof, will become apparent from the following detailed description and the accompanying drawings.

DETAILED DESCRIPTION

Figure 1:
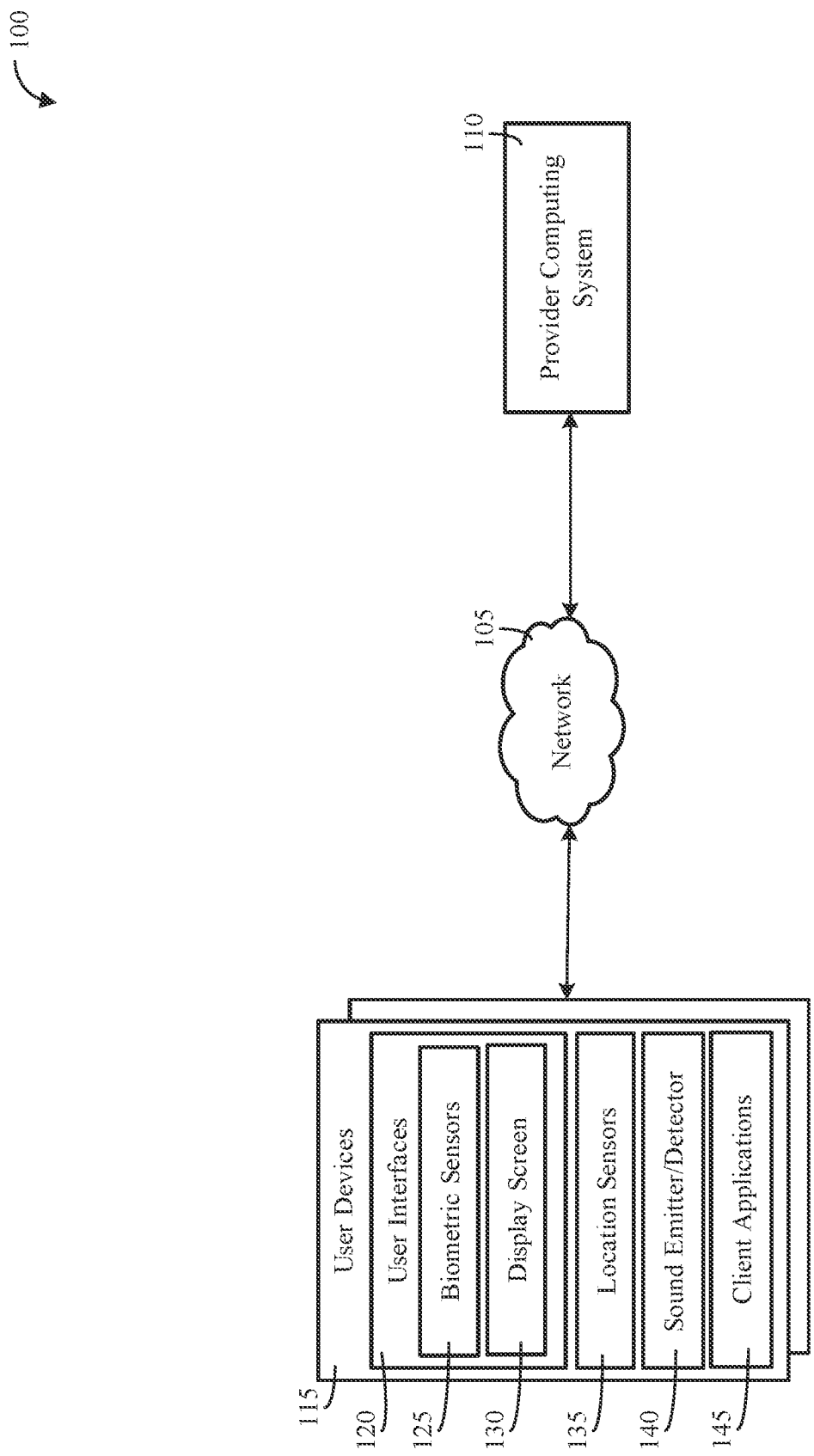
FIG. 1 is a block diagram of an example computer-implemented system for determining maturity metrics of a user, with a provider computing system in communication with various computing devices, according to potential embodiments.

Various implementations described herein relate to systems, methods, and devices for implementing machine learning techniques to determine a maturity metric of a user based on past conversations. In order to provide an appropriate response (e.g., a recommendation for a suitable product or service) to a user during a conversation with the user, maturity metrics, such as age, financial literacy, and education level, may be useful information. However, a new user may not have provided or registered any personal information and may thus be unknown to a chatbot with which the user is conversing. As a user interacts with a chatbot (such as a virtual assistant or other software application or device), such as during a spoken or written conversation with the chatbot (or during an advising session with a person), the user may indirectly provide information indicative of his or her maturity metrics through the words or phrases (e.g., colloquialisms, idioms, slang terms, jargon, lingo, etc.) used during the conversation. Such words or phrases (such as a particular slang term) may have no dictionary definitions, or otherwise may not be intended to indicate, for example, life circumstances or goals; but, even though they do not denote a metric being sought, use of the words or phrases may connote the metric. The disclosed approach allows maturity metrics of unknown users to be estimated while conversing with the users to generate and present more suitable responses during the conversations.

In some embodiments, a machine learning model may be trained to understand the words and phrases of users with known maturity metrics. The machine learning model may be trained using language data from prior conversations with users, such as past chatbot conversations, stored call logs with customers, etc. In various implementations, datasets are extracted from or generated using the past interaction data to be classified for certain maturity metrics. The machine learning model may additionally be trained to determine maturity metrics using data other than data on words and/or phrases used, such as transaction history, personal preferences, social media information, location data, and so on.

Once the machine learning model is trained, the model may be fed words or phrases during an ongoing conversation with a user to predict a maturity metric of the user. An estimated maturity metric may be generated during the conversation. As such, the chatbot or advising agent (e.g., human agent, human advisor) may present an enhanced response (e.g., recommend an appropriate service) to the user during the conversation with the user. A response generated based on the estimated maturity metric may be perceptibly presented to the user (e.g., visually via a graphical user interface, or audibly, such as a chatbot speaking the response). In some implementations, the interaction is a conversation between the user and a human advising agent. During this scenario, the response may be displayed on a graphical user interface of a computing device of the advising agent to use during the conversation.

Example embodiments of the machine learning model described herein improve computer-related technology by performing functions that cannot be carried out by conventional computing systems. Furthermore, the embodiments described herein cannot be carried out by humans themselves. The machine learning model may proactively determine an age of a customer during a conversation in order to provide a more appropriate and personalized recommendation or response to the customer. In some embodiments, the databases described herein may be data-type agnostic and configured to store and update a variety of information for thousands of users, account information, and so on. Conventional systems may include databases and definitions that are static and cannot be configured to acquire, store, and update the multitude of information in the database of data from interactions with customers. The use of the machine learning model as described herein may not only improve the user experience of customers during conversations with chatbots and advising agents, but also improve the efficiency of such conversations. As such, the systems and methods disclosed may allow a provider computing system to assist users on a greater scale, as well as in a quicker manner.

Referring to FIG. 1, a block diagram of an example system 100 for enabling the determination of a maturity metric, according to potential embodiments, is shown. The system 100 includes a provider computing system 110 (e.g., a computing system of a financial institution or other service provider), which may be implemented using one or more computing devices. The provider computing system 110 is described in greater detail with reference to FIG. 2. The system 100 may also include one or more user devices 115 (e.g., smartphones, smart speakers, tablets computers, wearable devices such as smartwatches, etc.). The user devices 115 may be used by customers of a provider 210 (FIG. 2) or may be used by employees of a provider. The components of system 100 may be communicably and operatively coupled to each other over a network, such as network 105, that permits the direct or indirect exchange of data, values, instructions, messages, and the like (as represented by the double-headed arrows in FIG. 1).

The network 105 may be any type of network. In some embodiments, the network 105 includes a wireless network interface (e.g., 802.11X, ZigBee, Bluetooth, Internet, etc.), a wired network interface (e.g., Ethernet, USB, Thunderbolt, etc.), or any combination thereof. The network is structured to permit the exchange of data, values, instructions, messages, and the like between user devices 115 and the provider computing system 110. The network interfaces (e.g., network interface 215 of provider computing system 110) may allow the computing systems and computing devices to communicate wirelessly or otherwise. The various components of devices in system 100 may be implemented via hardware (e.g., circuitry), software (e.g., executable code), or any combination thereof.

The one or more user devices 115 may include one or more user interfaces 120, which may include one or more biometric sensors 125 (such as an iris scanner, a fingerprint scanner, a heart monitor that identifies cardiovascular signals, etc.) and a display screen 130. In some embodiments, the display screen 130 includes a virtual keyboard and touchscreen. User interfaces 120 may also include several other input/output components that provide perceptible outputs (such as light sources for visually-perceptible elements, haptics for perceptible signaling via touch, etc.) and/or that permit the user to enter inputs (such as a keyboard, stylus, or force sensor for detecting pressure on the display screen 130). The user devices 115 may include one or more location sensors 135 to allow the user devices 115 to detect location relative to other physical objects (e.g., a bank branch, a merchant store, etc.) or geographic locations. Example location sensors 135 may include global positioning system (GPS) devices and other navigation and geolocation devices, digital compasses, gyroscopes and other orientation sensors, as well as proximity sensors or other sensors that permit the user devices 115 to determine the presence and relative distance of nearby devices, objects, and/or locations. The user devices 115 also are shown to include sound emitter/detector 140. The sound emitter/detector 140 can include a microphone and speaker for audible functions, such as speaking to a chatbot on a phone call or listening to a response output from a chatbot. The user devices 115 may include client applications 145, such as an Internet browser presenting websites, and applications provided or authorized by the entity implementing or administering the provider computing system 110. For example, client applications 145 may include a mobile banking application, which may be created and offered to customers by provider 210, which may run on the user devices 115.

Figure 2:
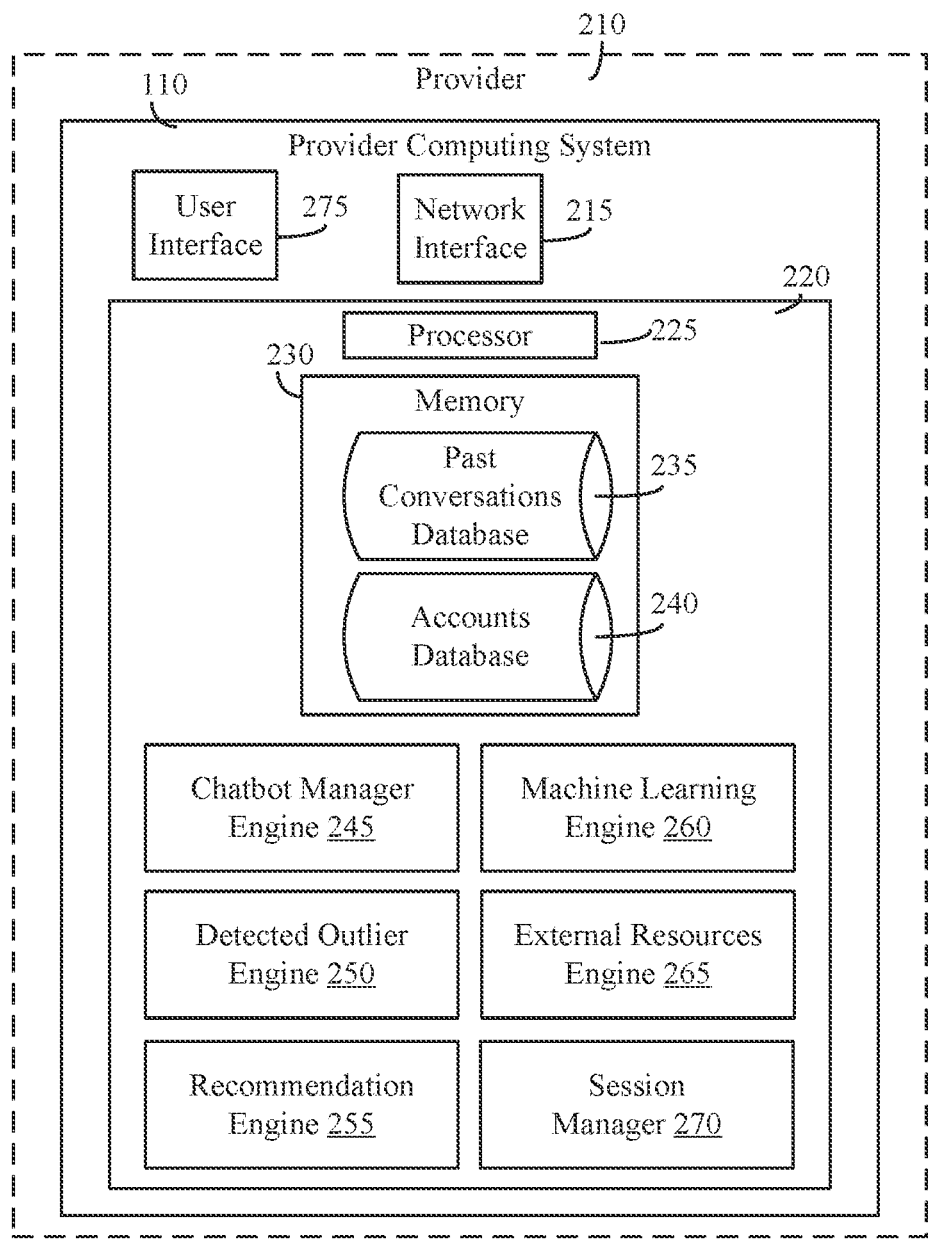
FIG. 2 is a block diagram of the provider computing system of FIG. 1, according to potential embodiments.

Referring now to FIG. 2, a block diagram of the provider computing system 110 for use in the system 100 to calculate a maturity metric is shown, according to example embodiments. Provider computing system 110 may include one or more computing devices or user devices 115 associated with the provider 210.

The provider computing system 110 includes a network interface 215, a processing circuit 220, a processor 225, a memory 230, and one or more user interfaces 275. The processor 225 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the provider computing system 110. The memory 230 (e.g., RAM, ROM, NVRAM, Flash Memory, hard disk storage, etc.) may store data and/or computer code for facilitating at least some of the various processes described herein. In this regard, the memory 230 may store programming logic that, when executed by the processor 225, controls the operation of the provider computing system 110. The memory 230 is shown to include a past conversations database 235 and an accounts database 240, for example. In some embodiments, the past conversations database 235 stores many previous interactions between customers of the provider 210 via user devices 115 and a chatbot (e.g., spoken conversations and/or written messages sent to and received from a chatbot). Past conversations database 235 may also include previous interactions between customers of the provider 210 via user devices 115 and user devices 115 of advisors (i.e., advising agents) that work for the provider 210 (e.g., written or audio conversations between a customer and an advisor via respective user devices 115). The past conversations database 235 can also be configured to store other data from interactions between customers and the provider computing system 110, such as emails, survey responses, etc. Customer account information (such as user profiles with personal data, bills and transaction history, communications sent to and received from the customer, location data, etc.) for customers of provider 120 may be stored in accounts database 240.

The network interface 215 may be structured to allow provider computing system 110 to communicate data to and from other devices (such as user devices 115) either directly or via the network 105. The one or more user interfaces 275 may include components that provide perceptible outputs (e.g., displays and light sources for visually-perceptible elements, a speaker for audible elements, and haptics for perceptible signaling via touch), and allow a user to provide inputs (e.g., a touchscreen, stylus, force sensor for, e.g., sensing pressure on a display screen, biometric components such as fingerprint reader, and microphone for detecting ambient sounds). In some embodiments, processing circuit 220 may contain several processors 225 to handle a greater need for computational power. Devices and components in provider computing system 110 may be added, deleted, integrated, separated, and/or rearranged in various embodiments of the disclosure.

Provider computing system 110 may include, but is not limited to, a chatbot manager 245, a detected outlier engine 250, a recommendation engine 255, a machine learning engine 260, an external resources engine 265, and a session manager 270. In various embodiments, functions of multiple components in the processing circuit 220 of provider computing system 110 may be integrated into a single engine, and/or functions of one component may be performed by multiple engines.

A chatbot manager 245 may be configured to instruct a chatbot to engage in a conversation with a customer. Such a conversation may be conducted by, for example, capturing a customer's spoken words (or other communications), analyzing the communication to better understand context and identify user needs, and responding to the customer or otherwise providing information determined to be relevant. In some implementations, inputs (or a portion thereof) received via the chatbot manager 245 from a chatbot conversation on a mobile client application may be stored in past conversations database 235. In some embodiments, the inputs (or a portion thereof) may also be fed to machine learning engine 260 for analyses, training of machine learning models to determine a maturity metric for the customer, and generating appropriate responses to the customer. Alternatively or additionally, chatbot manager 245 may perform the analyses needed to formulate suitable responses to users. In some implementations, certain analyses may be performed by chatbot manager 245 (e.g., determining what a user is asking), while other analyses (e.g., determining what recommendation would be suitable based on a financial issue and the user's circumstances, behaviors, etc.) may be performed via machine learning engine 260.

As described herein, the chatbot of a mobile software application (running on, e.g., user device 115 of a customer) may be configured to advise a customer using one or more mobile or non-mobile computing devices (e.g., user devices 115) capable of acquiring inputs from a user and automatically performing actions, or displaying recommendations for future actions by the user, that may affect a financial circumstance of the user. In some embodiments, the chatbot interacting with a user is accomplished using artificial intelligence tools, intelligent agents, machine learning techniques, or other logic and models capable of extracting relevant information from input streams that include both relevant and non-relevant information, for example. An interaction between a user and a chatbot may span several days, weeks, etc. and may cover related financial topics or unrelated topics.

The chatbot of a software application (e.g., a mobile banking application offered to users by the provider 210) may speak with customers to ask general questions. For example, the chatbot may inquire whether a customer needs any assistance with an investment decision, a major purchase option, loan management, options for managing debt, and so on. The chatbot may then follow up with more specific questions after a user input is received by the user device 115 of the customer. In some implementations, the chatbot may ask a user more specific questions. For example, the chatbot may inquire the user about the goal and timeline of an investment, features of a product to be purchased by the user, budget of the user, etc. In some embodiments, the chatbot may be a proactive listening bot (i.e., a chatbot that may be structured to detect signals using multiple or all computing devices of one or more users at all times or until turned off or otherwise deactivated). Accordingly, the chatbot may be able to detect words and phrases (e.g., colloquialisms, idioms, slang terms, jargon, lingo, etc.) of a user of a software application even outside of advising sessions or ongoing conversations.

In some embodiments, a detected outlier engine 250 is configured to receive a notification from the machine learning engine 260 of the inability to classify a word or phrase into a generated dataset with a certain confidence level. The detected outlier engine 250 may then generate a notification to send to a user device 115 associated with the provider 210. The notification may include the word and/or phrases that the machine learning engine 260 was unable to sort. The notification may request a manual entry for how to classify the word or phrase. For example, the machine learning engine 260 may determine a word or phrase was used by several users with varying known maturity metrics and may then be unable to sort the word or phrase with a confidence above a certain threshold (e.g., greater than 60% confident). In some embodiments, the detected outlier engine 250 is configured to receive the manual entry of a dataset into which to sort the word or phrase and to instruct the machine learning engine 260 to sort the word or phrase into the appropriate dataset. As such, the detected outlier engine 250 may "brute force" the sorting of specific words or phrases, for example.

A recommendation engine 255 may be configured to determine a product or service to recommend to a user based on the maturity metric identified by the machine learning engine 260. In some embodiments, the recommendation engine 255 receives an age or age range of a user determined by the machine learning engine 260 and uses the maturity metric to predict a service or product that the user may need or desire. For example, if the machine learning engine 260 outputs an estimated age of 65 for a user, the recommendation engine 255 determines that a retirement plan may be desired for the user. In another example, the machine learning engine 260 calculates an estimated education level of a user as currently enrolled in college. As such, the recommendation engine 255 determines a plan for paying back student loans or recommends a college student credit card plan. In some implementations, the recommendation engine 255 generates a link or promotional video for the recommended product or service to transmit to the user device 115 associated with a customer via the network 105. The recommendation engine 255 may be configured to only output a recommended product or service if the estimated maturity metric determined by the machine learning engine 260 has a confidence score above a threshold amount, such as above 60%, above 80%, etc. The threshold amount for the confidence score may be set by an instruction from a user device 115 associated with the provider computing system 110, for example, a computer of an employee of the provider 210. In some implementations, recommendation engine 255 also is configured to determine a verbal or written response from a chatbot to transmit to the user device 115 of the user based on a determined maturity metric from the machine learning engine 260.

A machine learning engine 260 may be configured to execute machine learning techniques (e.g., classification models, pattern recognition models, clustering techniques, etc.) or use an artificial intelligence (AI) agent to learn how to sort language data received from previous interactions between a chatbot and a user, an advisor and a user, and other interactions between a user and different channels associated with the provider computing system 110. In some embodiments, the machine learning engine 260 is trained using past conversations between a chatbot and a plethora of users with known ages to determine a user age based on words spoken or written by the vast amount of users. The machine learning engine 260 also can be configured to receive and sort language data during an ongoing interaction between a user of user devices 115 and a chatbot in order to determine an estimated maturity metric (e.g., an age, an age range, an education level, or a financial literacy). For example, during a conversation between the user via a user device 115 and a chatbot, ambient sounds may be captured by the sound emitter/detector 140. The machine learning engine 260 may then analyze the ambient sounds to recognize a set of words spoken by the user during the conversation and apply several machine learning techniques to determine an age of the user. In various implementations, the machine learning engine 260 is also configured to determine an appropriate response to transmit to the user device 115 of the user based on the determined maturity metric. The machine learning engine 260 may include a classifier that is trained by applying supervised learning to the words or phrases spoken during past conversations with a chatbot. However, in other embodiments, the machine learning engine 260 is trained using unsupervised learning.

An external resources engine 265 may be configured to access data from information sources other than the provider computing system 110 and user devices 115. In some implementations, the external resources engine 265 may use, for example, any combination of one or more APIs, SDKs, or other hardware/software mechanisms that facilitate data exchange or communication between and among co-located or remote computing systems with various access protocols. Alternatively or additionally, the external resources engine 265 may access publicly-available information sources. External resources may include financial product websites, merchant websites, and other sources of information on available products. In certain implementations, the external resources engine 265 may access social networking websites for information on, for example, life events and familial or other relationships to understand (in an automated fashion) the needs, circumstances, and likely goals of a user. The social networking websites may also provide information that the machine learning engine 260 can use in determining a maturity metric for the user, such as social media posts with certain word and/or phrase language or with information about a certain business, celebrity, purchases, customs, habits, etc. associated with a certain age demographic. The external resources engine 265 may similarly access other sources of information, such as credit agencies, news sources, financial institutions, governmental bodies, etc. Information from such sources may provide inputs to the provider computing system 110. The information may also be made available to human advisors (e.g., via user devices 115 or other computing devices) to assist with advising sessions.

A session manager 270 may be configured to initiate and terminate communications sessions between user devices 115 of customers of the provider 210 and computing devices of the provider computing system 110 (e.g., user devices 115 of employees of the provider 210). Such advising sessions may incorporate one or more of audio, video, and text entries of users and advisors. In some implementations, advising sessions may be conducted via the same dashboard (e.g., from within the same application) through which the user interacts with a chatbot. Advising sessions may begin at times scheduled by the customer via the software application and/or on an ad-hoc basis.

Figure 3:
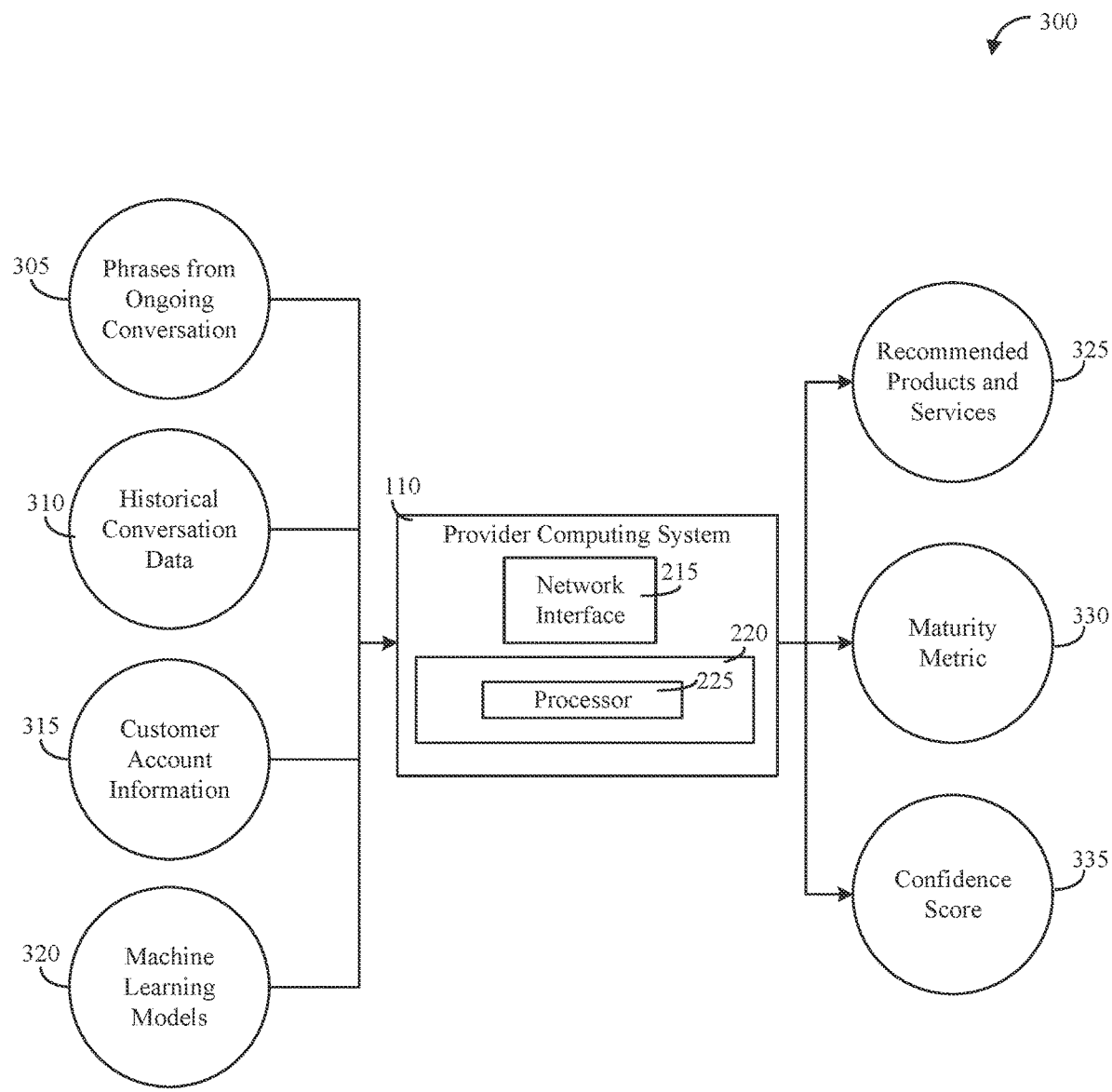
FIG. 3 is an example of data input into the provider computing system of FIG. 1 and the outputs determined by the provider computing system from analysis of data during interactions between a user and a chatbot, according to potential embodiments.

Referring now to FIG. 3, a block diagram of one or more inputs for the provider computing system 110 and one or more outputs calculated by the provider computing system 110 is depicted, according to some embodiments. The inputs into provider computing system 110 may be provided by communications received via network 105 from one or more user devices (e.g. user devices 115) and/or other systems within provider 210. For example, an employee of the provider 210 may enter, via a user device 115 of the employee, a manual designation of a dataset to classify a particular word or phrase. Another example includes a microphone of user device 115 detecting words spoken by the user (e.g., a customer of the provider 210) of the user device 115 and transmitting data of the language used to provider computing system 110 via the network 105. In some embodiments, the inputs to provider computing system 110 include, but are not limited to, "phrases from ongoing conversation" input 305, "historical conversation data" input 310, "customer account information" input 315, and "machine learning models" input 320. "Phrases from ongoing conversation" input 305 may include words and phrases of a current interaction between a customer via a user device 115 of the customer and the provider computing system 110 (e.g., a chatbot, a user device 115 of an advisor, etc.). In some embodiments, the "phrases from ongoing conversation" input 305 may be received in real-time via the network interface 215 or near real-time (e.g., as new, written messages are received from the user device 115 of the customer or audio data from words spoken by the customer that are detected by a microphone of the user device 115). The "phrases from ongoing conversation" input 305 may be utilized by the machine learning engine 260 in determining a maturity metric of the current user interacting with a chatbot.

"Historical conversation data" input 310 may include a multitude of data from previous interactions between users of a software application of the provider 210, such as conversations between a user and a chatbot to discuss financial goals or creating financial plans. The information from "historical conversation data" input 310 may also include call logs between customers of the provider 210 and an advisor (e.g., a financial advisor) or a chatbot. In some embodiments, "historical conversation data" input 310 also includes emails, survey responses, etc. that are stored in the past conversations database 235 and/or accounts database 240.

In some embodiments, "customer account information" input 315 may include information on customer profiles, such as banking account information, payment history, and personal information (e.g., occupational status, number of children, current address, race, gender, health, etc.). The variety of data from "customer account information" input 315 may be received via communications through network 105 and stored in accounts database 240 within provider computing system 110.

"Machine learning models" input 320 may include a variety of machine learning techniques that are used in classification and pattern recognition of data acquired from "historical conversation data" input 310, "phrases from ongoing conversation" input 305, and "customer account information" input 315 in order to determine normal patterns of words and/or phrases received from users via the user devices 115. Regression techniques may also be included in "machine learning models" input 320 for the machine learning engine 260 to decide which data points are the most important causal factors that may drive certain results. Additionally, "machine learning models" input 320 may include classification models and pattern recognition models which may drive the provider computing system 110 to decide which dataset is best to sort a particular word and/or phrase. For example, if the provider computing system 110 receives the phrase "currently attending my first year of university" from "phrases from ongoing conversation" input 305, a classification model may specify to then classify that phrase into a dataset with a known maturity metric of an age range from 18 to 22 years of age.

In some embodiments, clustering techniques are also included in "machine learning models" input 320. Clustering techniques may be utilized by the machine learning engine 260 in situations when it is uncertain how to classify a word and/or phrase. When these circumstances occur, the clustering techniques may classify the word and/or phrase in a specific category because it is within a specific distance to a cluster of other data. Furthermore, "machine learning models" input 320 may include a classifier that is trained by applying supervised learning to words spoken during past conversations with a chatbot.

One or more outputs of provider computing system 110 may include, but are not limited to, "recommended products and services" output 325, "maturity metric" output 330, and "confidence score" output 335. In some embodiments, "recommended products and services" output 325 includes a generated recommendation to offer to a user based on the determined maturity metric of the user. For example, if the determined maturity metric of the user is estimated to be an age range of about 15 to 25 years of age, the "recommended products and services" output 325 may include a college savings plan or student credit card option. A recommendation may be for a type of retirement plan, a savings plan, credit card plans, investment options, payment plans for loans or mortgages, etc. The "recommended products and services" output 325 may include an activatable link, promotional video, information document, etc. that can provide the user with more information on the recommendation.

"Maturity metric" output 330 may include an estimated output of a user's age, age range, financial literacy, or education level, or other maturity metrics, according to various embodiments. A maturity metric of age or range may include an estimated age of a user. In some embodiments, the maturity metric may include an estimated generation of the user (e.g., baby boomer, Gen X, Gen Z, millennial, etc.). The maturity metric of education level may include output options of completed high school, completed university, completed graduate school, some high school, doctorate diploma, etc. Financial literacy may include, but is not limited to, output options of none, low, medium, high, very experienced, etc. The "maturity metric" output 330 may be used in providing an enhanced recommendation or user experience to a customer while the customer is interacting with a chatbot on a software application.

In some embodiments, "confidence score" output 335 includes a calculated number, percentage, or other value (e.g., low, medium, high) of the estimated maturity metric. The "confidence score" output 335 may be generated by the machine learning engine 260 after determining the maturity metric of a user. For example, if the provider computing system 110 receives a phrase of "I just started my first year of college" from a user via user device 115, the machine learning engine 260 may estimate an age range of 17 to 23 for the user with a confidence score of 88%. In another example, if the network interface 215 receives a phrase that says "that credit card plan sounds fresh" during a text conversation between the user and a chatbot, the machine learning engine 260 may estimate an age range of 18 to 28 with only a confidence score of 70%. The confidence score may be calculated by the machine learning engine 260 based on the number of times that word or phrase was used in a conversation with a user having a known maturity metric (e.g., the age of the user is given in the user's account information).

In other embodiments, there may be additional or fewer inputs to provider computing system 110 and/or additional or fewer outputs generated by the provider computing system 110. Data from external resources engine 265 may also be an input to the provider computing system 110, including, but not limited to, information on speech patterns, grammar use, jargon, habits of particular age groups, social media posts, and context for terminology used by a customer, for example. In some embodiments, the inputs to and/or outputs from the provider computing system 110 may be combined into a single input or output. For example, "historical conversation data" input 310 may be included in the "customer account information" input 315. Further, the outputs of provider computing system 110 may also factor as inputs to calculations of specific outputs. The "maturity metric" output 330 may factor as an input to the "recommended products and services" output 325, for example. As another example, the "confidence score" output 335 may also factor as an input to the "recommended products and services" output 325. For example, if the "confidence score" output 335 is below a certain threshold, such as a 60% confidence level, "recommend products and services" output 325 does not generate a recommendation in certain embodiments.

Figure 4:
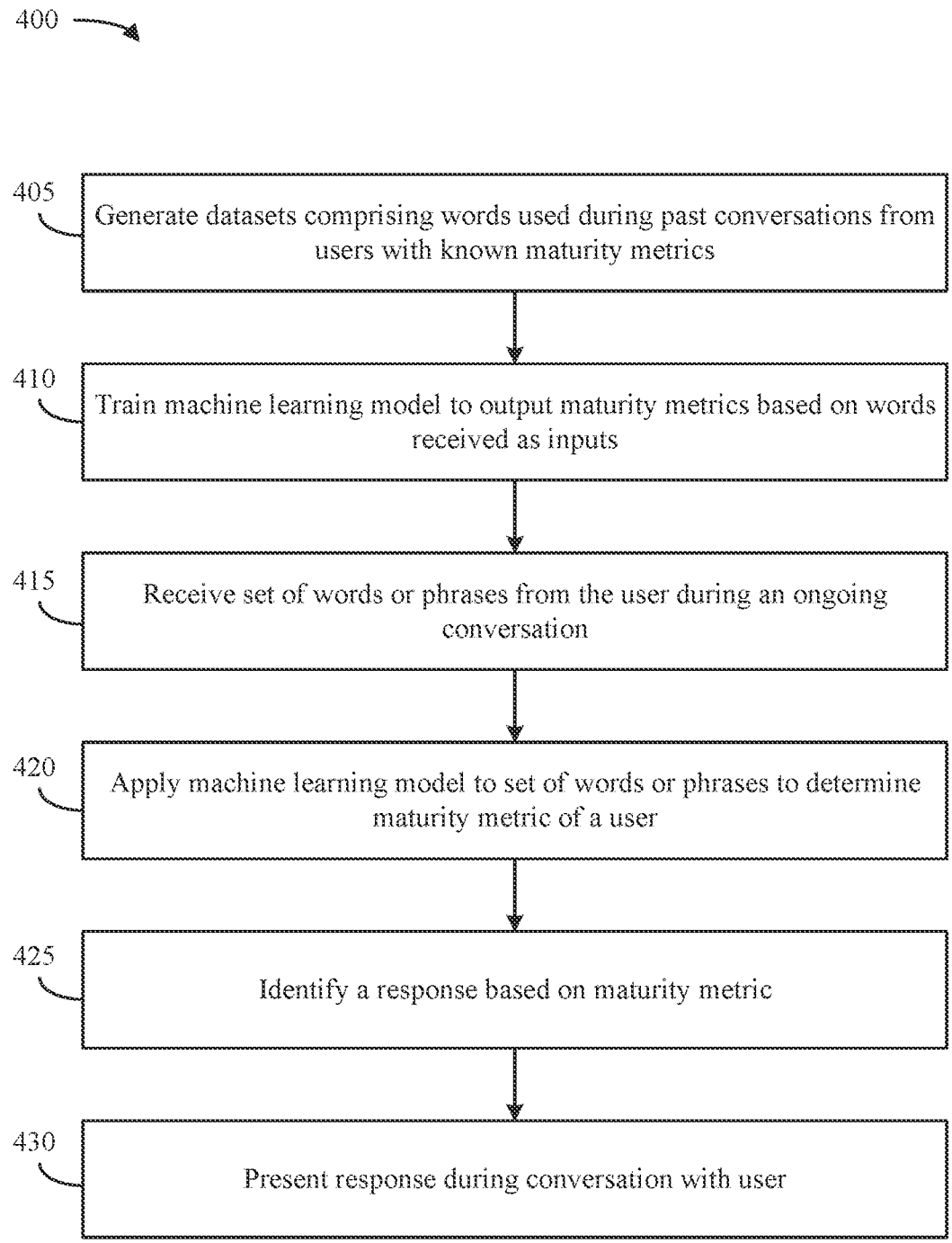
FIG. 4 is an example approach for applying a machine learning model to determine a maturity metric of a user during an ongoing conversation, according to potential embodiments.

FIG. 4 provides an overview of process 400 of an example approach for determining a maturity metric of a user associated with one of the user devices 115, according to potential embodiments. The process may be implemented by provider computing system 110, with involvement from one of the user devices 115. At 405, provider computing system 110 (via, e.g., machine learning engine 260) may generate datasets comprising words and/or phrases used during past conversations between a chatbot and numerous users with known maturity metrics. The known maturity metrics may be acquired from "customer account information" input 315. In some embodiments, the acquired data from past conversations is received in real-time or near real-time (e.g., as user activity is created by customers currently accessing a software application via user devices 115), or periodically (e.g., on a daily, weekly, or different time basis). In some embodiments, the machine learning engine 260 receives one or more classifications for maturity metrics of users, generates datasets for the maturity metric, and sorts the acquired data from "historical conversation data" input 310 into the closest related dataset. The machine learning engine 260 may sort the acquired data using various pattern recognition and classification models (e,g., from "machine learning models" input 320).

At 410, provider computing system 110 (via, e.g., machine learning engine 260) may train a machine learning model by applying learning techniques to the generated datasets to output maturity metrics based on the words and/or phrases received as inputs. In various implementations, the training of the machine learning model is supervised. For example, during training, if the machine learning engine 260 is unable to sort a word or phrase into a dataset for a maturity metric (e.g., age, education level, etc.) based on a word or phrase, the machine learning engine 260 may receive a manual input from a user device 115 associated with the provider computing system 110 of the dataset to sort the word or phrase. In other implementations, the machine learning model may be trained without any supervision (e.g., without any external input).

At 415, provider computing system 110 (via, e.g., chatbot manager 245 or session manager 270) may receive a set of words and/or phrases from a user of a user device 115 during an ongoing conversation. In some embodiments, the words and/or phrases are received from the user either through written text or spoken words and/or phrases. For example, the user device 115 may transmit a text with written words and/or phrases to the provider computing system 110, or the sound emitter/detector 140 of the user device 115 may detect the words and/or phrases spoken by the user during a call (e.g., a phone call with a financial advisor) to the provider computing system 110 that were spoken by the user.

At 420, the provider computing system 110 may apply machine learning model(s) to the set of words and/or phrases received at 415 in order to determine a maturity metric of the user of user device 115. In some embodiments, the machine learning engine 260 uses classification models and clustering techniques to predict an estimated age of a user. The machine learning engine 260 may apply several machine learning models until a certain confidence score is achieved. For example, the machine learning engine 260 may continue applying the models until it can predict with 80% confidence that a user has a certain maturity metric. For example, at 420, regression techniques may be employed to decide what dataset a word or phrase received from a user is most similar based on words and phrases in datasets for a certain age range. In some embodiments, regression techniques that may be used by the machine learning engine 260 include, but are not limited to, linear regression models, logistic regression models, Support Vector Machine (SVM) techniques, Least Absolute Selection Shrinkage Operator (LASSO) regression models, polynomial regression models, and other regression tree models.

In some embodiments, at 425, the provider computing system 110 identifies (via, e.g., recommendation engine 255) a response based on the maturity metric determined at 420. In some embodiments, the response includes a link, a promotional video, or other informational material on a recommended service or product for the user. For example, if an age of a user is determined at 420 to be 20 years of age, the recommendation engine 255 may generate a response for the chatbot to send the user information on college savings accounts. In another example, if a financial literacy is determined to be high, recommendation engine 255 may provide more complex investment options to the user of the software application during an advising session. In yet an additional example, if machine learning engine 260 determines that a user has an estimated educational level of some high school, recommendation engine 255 may generate a response including a link to credit card plans for high school students.

At 430, the provider computing system 110 may present the response generated at 425 during the ongoing conversation with the user of user device 115. For example, chatbot manager 245 may graphically present the response by sending a message from a chatbot. In other examples, the session manager 270 may generate a notification to the GUI 800 (FIG. 8) for an advisor to read the response to the user during a call. In some embodiments, a response may audibly be presented on a software application to the customer of user device 115 using an automated voice of a chatbot.

Figure 5:
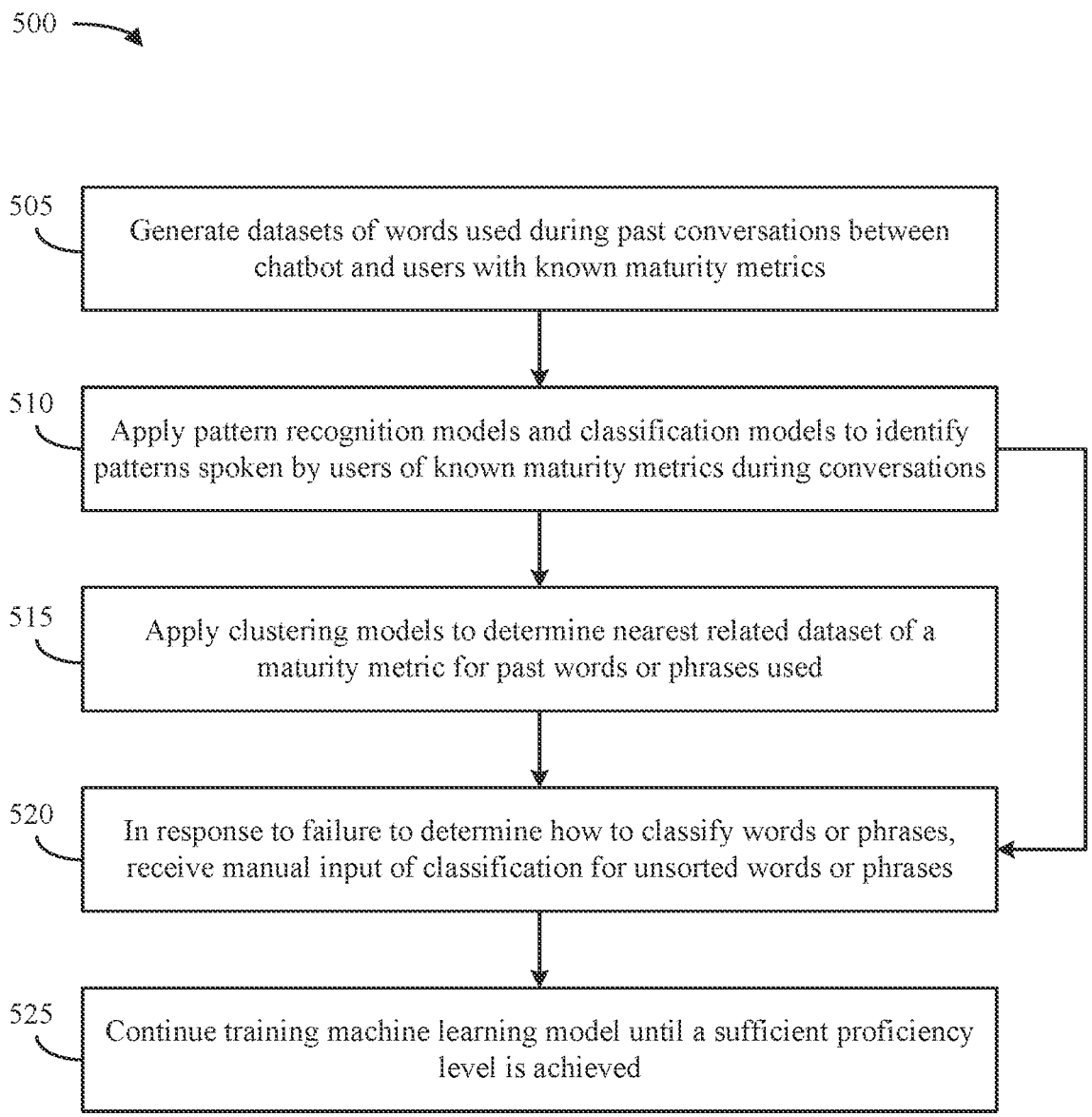
FIG. 5 is an example approach for using a machine learning model to determine an age or age range of a user based on words spoken by the user during an ongoing conversation, according to potential embodiments.

Referring now to FIG. 5, a process 500 of an approach for training a machine learning model (e.g., machine learning engine 260) to determine maturity metrics of users based on words and phrases is shown, according to potential embodiments. In some implementations, the generated datasets are created by sorting, categorizing, extracting, and/or manipulating acquired data from past conversations database 235. At 505, datasets of words used during past conversations between a chatbot and users with known maturity metrics may be generated. The machine learning engine 260 may know a maturity metric of users associated with previous conversation data by analyzing the information in accounts database 240. For example, the age and education level of customers may be included in a customer account profile stored in the accounts database 240. At 510, provider computing system 110 (via, e.g., machine learning engine 260) may apply pattern recognition models and classification models to identify patterns spoken by users with known maturity metrics during past conversations. The machine learning engine 260 may then sort words and/or phrases spoken by users into the generated datasets based on the identified patterns. In some embodiments, the machine learning engine 260 also applies pattern recognition models and classification models to other kinds of past interactions between the provider computing system 110 and users. For example, pattern recognition models may be applied to emails from customers, survey responses, questionnaire answers, search history of users, etc. stored in accounts database 240 in order to recognize normal use of certain words or phrases (e.g., colloquial language, jargon, acronyms, text abbreviations, etc.) by users with known maturity metrics.

At 515, machine learning engine 260 may apply clustering models to employ additional machine learning techniques to classify a dataset of words or phrases into the nearest related cluster. The number of clusters may be communicated to provider computing system 110 from user devices 115 to limit or expand the complexity of the machine learning engine 260, or may be variable depending on the data acquired from the "historical conversation data" input 310. In some embodiments, the number of clusters can be predetermined in order to fit the various ages into a preferred number of clusters. In some implementations, a cubic clustering criterion (CCC) statistic may be calculated (from SAS procedure FASCLUS) to determine the maximum number of clusters to allow for training the machine learning engine 260.

In some implementations, past words and/or phrases from historical conversations between users and a chatbot, or between users and an advising agent (e.g., an employee of the provider 210) can be categorized using a k-means clustering algorithm that is unsupervised, with no dependent variable associated therewith. Alternatively or additionally, other approaches can be used to detect a sequence or pattern of behavior in the demographics of customers and completing various tasks on the online software application successfully. For example, long short term memory (LSTM) recurrent neural networks (RNNs), gradient boosted trees, logistic regression, hidden and basic Markov models, and frequent pattern growth algorithms may be utilized in classifying patterns and decisions while training the machine learning engine 260.

In some embodiments, clusters may be developed using, for example, Python, SAS, R, Spark and/or H20. In certain versions, k-means clustering may be developed using the SAS FASTCLUS procedure, which performs a disjoint cluster analysis on the basis of distances computed from one or more quantitative variables. The observations may be divided into clusters such that every observation belongs to one and only one cluster. The clusters may not form a tree structure. The FASTCLUS procedure uses Euclidean distances, so the cluster centers are based on least-squares estimation. This kind of clustering method is often called a k-means model. The clustering aims to partition n observations into k clusters in which each observation belongs to the cluster with the nearest mean. The final cluster centers are the means of the observations assigned to each cluster when the algorithm is run to complete convergence. Each iteration reduces the least-squares criterion until convergence is achieved.

For example, given a set of observations $(x_1, x_2, \ldots, x_n)$, where each observation is a d-dimensional real vector, k-means clustering aims to partition the n observations into $k(\leq n)$ sets $S=\{S_1, S_2, \ldots, S_k\}$ so as to minimize the within-cluster sum of squares ("WCSS") (i.e. variance). Formally, the objective is to find:

$$\arg\min \sum_{i=1}^{k} \sum_{x \in S_i} \|x - u_i\|^2 \qquad \text{Eq. 1}$$

where $\mu_i$ is the mean of points in $S_i$.

While provider computing system 110 executes the machine learning techniques, one technique may be applied (such as at 510) before a different type of machine learning technique is carried out (such as at 515). Instead of proceeding to 520, however, it may be needed to apply the same machine learning technique used before (such as repeating 510 to apply further pattern recognition models and classification models) to make a new decision or after discovering a new scenario in which a word and/or phrase is used. In various embodiments, provider computing system 110 (via, e.g., machine learning engine 260) may determine how to proceed throughout process 500 at least in part based on inputs received from user devices 115 associated with the provider 210 (e.g., user devices 115 of employees of the provider 210).

At 520, in response to failure to determine how to classify a word and/or phrase, provider computing system 110 may receive manual input of a classification for unsorted words and/or phrases. In some embodiments, the manual input is received by a user device 115 associated with the provider 210 via the display screen 130. As such, the machine learning engine 260 may "brute force" classification of some words and/or phrases.

At 525, the provider computing system 110 may continue training machine learning model (e.g., via the machine learning engine 260) until a sufficient proficiency level is achieved. The proficiency level may be determined based on how quickly the machine learning engine 260 takes in order to generate an estimated maturity metric for a user. In other embodiments, the proficiency level may be the ability to predict a maturity metric with a certain confidence level (e.g., above 80%). Instead of the machine learning model training until a certain proficiency level is achieved, the machine learning model may be trained for a predetermined amount of time or on a specific amount of data. For example, the machine learning model may be trained for a certain time (e.g., two hours) or until a certain number of past conversation logs (e.g., 2000) are analyzed.

Figure 6:
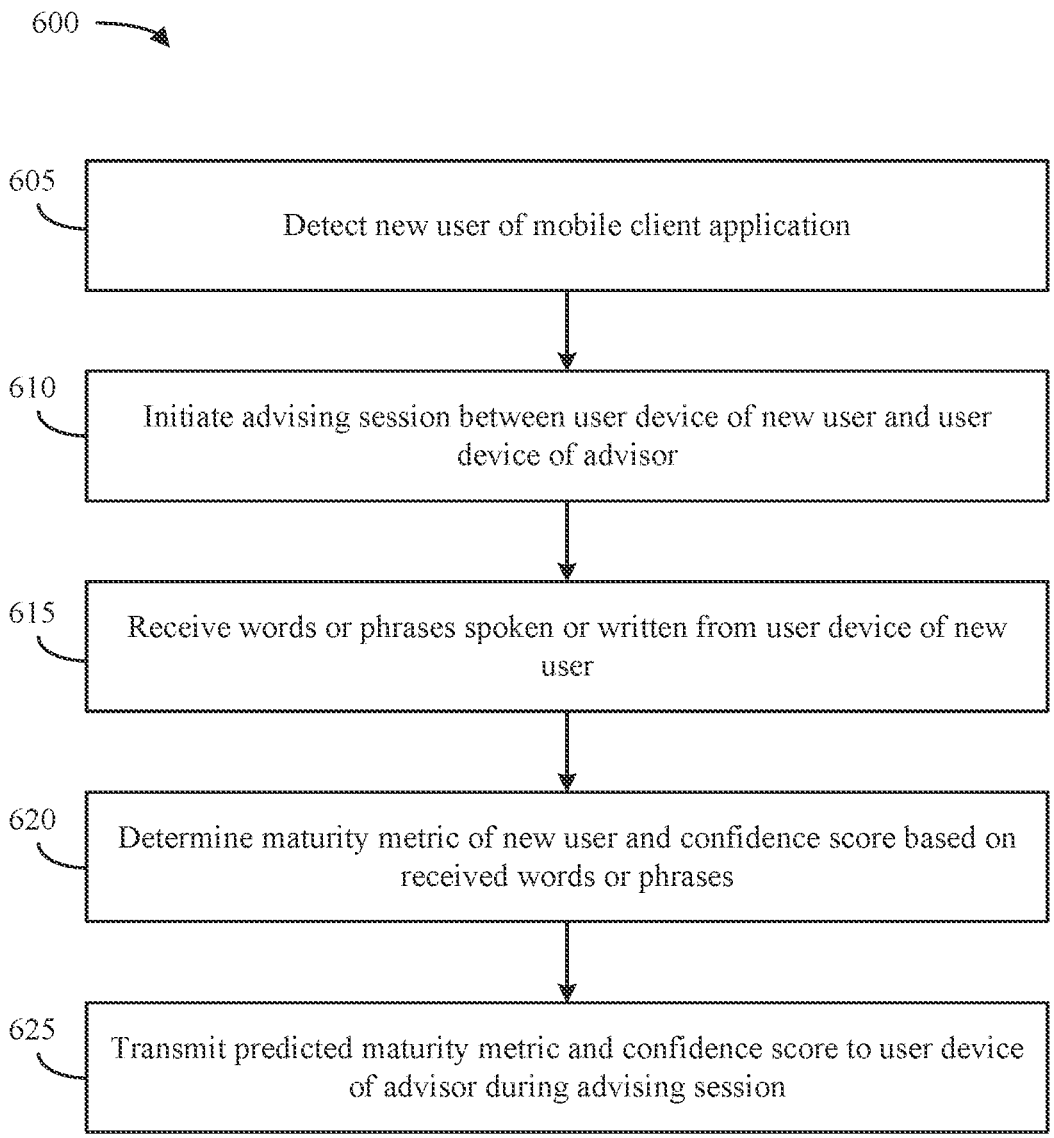
FIG. 6 is an example approach for determining a maturity metric of a new user during an advising session between the computing device of the new user and a computing device of the advisor, according to potential embodiments.

FIG. 6 is an example approach of predicting a maturity metric of a new user during an advising session, according to potential embodiments. The process 600 may be carried out in the system 100 described in FIG. 1. At 605, the network interface 215 may detect a new user of a mobile client application (e.g., a mobile banking application). Because the user is new, no previous information on the user may be known, such as a name, personal preferences, transaction history, demographic information, etc. As such, it may be difficult for a chatbot or an advisor (e.g., a human agent) via a user device 115 to provide the most appropriate recommendation of products and/or services and customer experience to the new user. The session manager 270 may initiate an advising session between the user device 115 of the new user and a user device 115 of an advisor (e.g., employee of the provider 210) at 610. In some implementations, the advisor is a preprogrammed chatbot for providing user experiences to customers. The advising session may be conducted over a phone call. In other embodiments, the advising session is conducted via a user interface on the user devices 115 of the customer for sending and receiving messages. At 615, provider computing system 110 may receive, via the network interface 215, words or phrases spoken or written from the user device 115 of the new user. For example, the sound emitter/detector 140 may detect voice data from the new user and transmit the data over network 105. The machine learning engine 260 may then acquire the words and/or phrases in order to apply machine learning techniques to determine which dataset the words and/or phrases are most related. The machine learning engine 260 may then determine a maturity metric of the new user and a confidence score based on the words and/or phrases (620). For example, if a new user sends, via a user device 115 of the new user, a message to the user device 115 of the advisor with the phrase "retiring soon," the machine learning engine 260 may generate an estimated maturity metric of the user as an age range from 60 years of age to 70 years of age (or, e.g., a baby boomer classification) with a confidence score of 95%. At 625, the provider computing system 110 may transmit the predicted maturity metric and confidence score to a computing device (e.g., user device 115) of the advisor during an advising session. In some embodiments, the predicted maturity metric may be updated periodically as the advising session continues and more data is acquired from the new user (e.g., data from the new user speaking, data from navigation of a software application, etc.). As such, the advisor (e.g., a human advisor using a user device 115 to conduct the interaction with the new customer or a chatbot) may be able to assist the new customer more appropriately, providing a better overall experience for the new customer.

Figure 7:
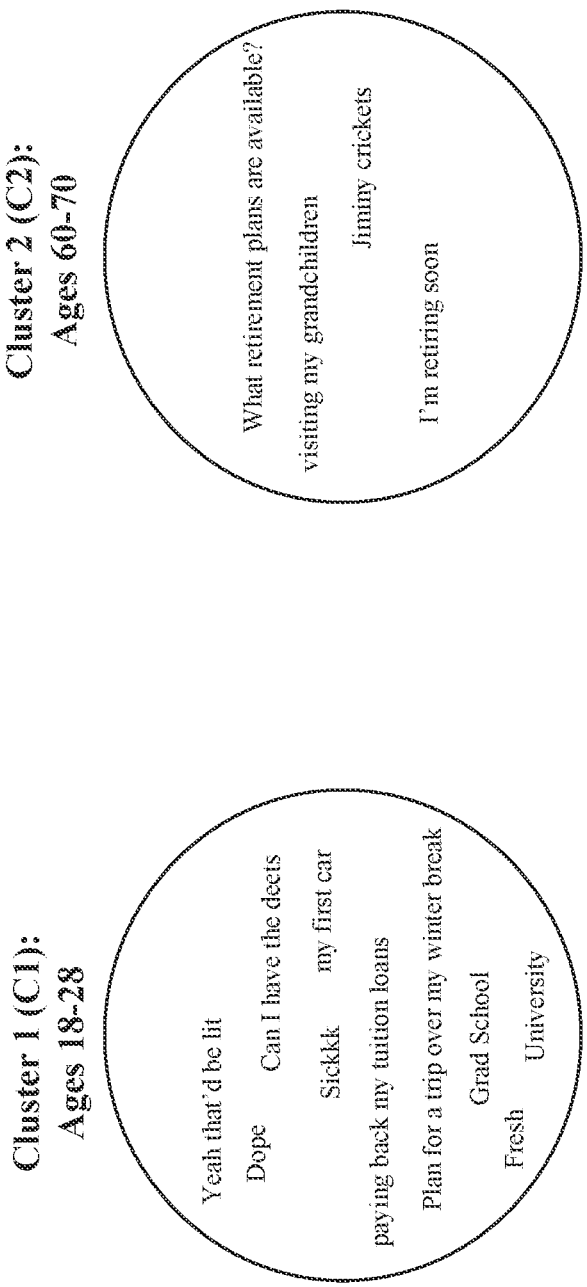
FIG. 7 is example approach of sorting historical conversation data into generated datasets using clustering on the specific words or phrases, according to potential embodiments.

FIG. 7 provides an example of how data acquired from past conversations between users and a chatbot (e.g., from "historical conversation data" input 310) may be clustered into datasets generated by machine learning engine 260, according to some implementations. In some embodiments, a multitude of previous conversation logs are input into the provider computing system 110 to be analyzed and extract data to use in training the machine learning engine 260. The past conversation data may already be stored in memory of the provider computing system 110 (e.g., in past conversations database 235), or may be received from additional user devices 115 of customers. The cluster categorizations, shown Cluster 1 (C1) and Cluster 2 (C2) may be organized into classifications of maturity metrics, such as age ranges, financial literacy levels, education levels, or some combination thereof. For example, clusters may be grouped for age ranges spanning 10 years, high school versus post-secondary education, or varying levels of financial literacy (e.g., none, low, medium, high). Each of the clusters may include data acquired from past conversations database 235, chatbot manager engine 245, and accounts database 240. In some embodiments, as an ongoing conversation between a customer and a chatbot is conducted, the machine learning engine 260 may receive words and/or phrases from chatbot manager engine 245 to sort into generated clusters of data. The language data in each of the clusters may also include an associated confidence score generated by the machine learning engine 260. For example, the greater the frequency a user with a known maturity metric uses the term "university," the greater the confidence score may be that is linked to the term "university" in the cluster. In other implementations, the clusters of maturity metrics may also include data, such as shopping preferences, transaction history, etc. of users in addition to the language data of words and/or phrases.

An example of two different clusters for the maturity metric of age of users and words and/or phrases that may be stored in the different clusters is shown in FIG. 7. Cluster C1 includes language data from users with a known maturity metric of being in an age range of 18 to 28 years old. Cluster C2 includes language data from users with a known maturity metric of being in an age range of 60 to 70 years old. For example, from the "historical conversation data" input 310, a user with a known age of 64 sent a message to a chatbot that said, "What retirement plans are available?" In some implementations, the amount of clusters may have no maximum amount of clusters, or may have a specified amount of clusters given as input from user devices 115 (e.g., user devices associated with the provider 210) to simplify the process of data classification.

Certain words or phrases in the clusters sorted by machine learning engine 260 may have no dictionary definitions. In various embodiments, a word or phrase (e.g., a slang term, lingo, jargon, colloquialisms, etc.) used by a customer has a different connotation than a standard dictionary definition. For example, a user who has a known maturity metric (e.g., the user is classified as a millennial) may use the slang term "sick" to imply something was cool. The use of particular words and phrases of a customer may point out goals or life circumstances of the customer, without the intention of a customer to do so. As such, even though a user may not directly signify a metric being sought (e.g., age), by the machine learning engine 260, the words or phrases may imply the maturity metric. In other embodiments, the machine learning engine 260 may also analyze non-standard message formats received by the chatbot from a user device 115 of a customer, such as memes, gifs, images, etc. Furthermore, the spelling and grammar of the words and/or phrases in messages received by the chatbot can be analyzed for information to use when determining the maturity metric of a user.

Figure 8:
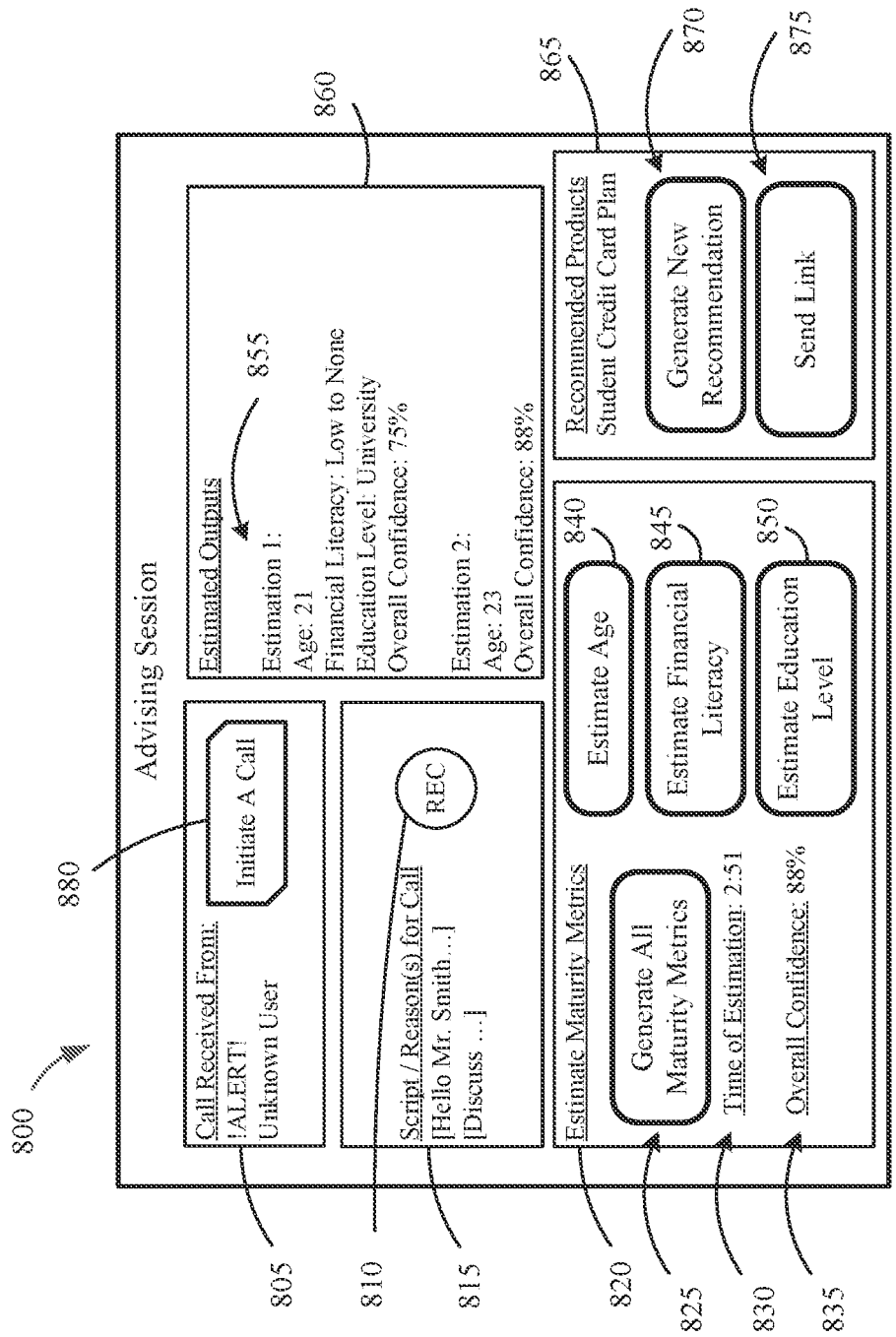
FIG. 8 is an example graphical user interface (GUI) for generating estimated maturity metrics during a call advising session on a computing device of an advisor, according to potential embodiments.

Referring to FIG. 8, example GUI 800 of a potential dashboard during an advising session is shown, according to potential embodiments. The GUI 800 may be presented (via, e.g., session manager 270) for an advising session over the phone with a customer via respective user devices 115 of the advisor and the customer. In other embodiments, a similar GUI may be shown for an advising session conducted over chat messages sent between the user devices 115 on a software application between a chatbot and the user or an advisor and the user. The provider computing system 110 is structured to generate the GUI to help improve user experience and recommendations for a customer based on determined maturity metrics. Caller frame 805 may provide information on the user that the advisor is interacting with during the advising session. In some embodiments, caller frame 805 displays personal information, such as a name, location, preferences, etc. of a customer, when the customer is a known user registered on a software application or with the provider 210. When a user is unknown (e.g., a new customer), the caller frame 805 may indicate the unknown user with an alert or warning notification. The caller frame 805 may also include an "Initiate a Call" button 880 that may be activatable via the GUI 800 (e.g., on the user interface of a phone or personal computer). In response to the "Initiate a Call" button 880 being activated, an interface for entering information to call and begin a new advising session may be generated and displayed. In various implementations, a script frame 815 may provide text to an advisor to say during the phone conversation with the user over the user devices 115. The script frame 815 may include a record button 810. In response to the record button 810 being activated, the phone conversation between a user and an advisor may be recorded. The session manager 270 may then store the recording in past conversations database 235 upon completion of the advising session.

Estimate maturity metrics frame 820 may include various options to provide to an advisor during an advising session with a customer. The ability to estimate a maturity metric of a customer may beneficially increase the knowledge of the customer the advisor is interacting with during the advising session. By being more informed about a demographic of customer (e.g., the age of the customer, the education level of the customer, etc.), the advisor may provide better customer service. The estimate maturity metrics frame 820 includes a "Generate All Maturity Metrics" button 825, "Time of Estimation" information 830, "Overall Confidence" information 835, "Estimate Age" button 840, "Estimate Financial Literacy" button 845, and "Estimate Education Level" button 850. In some embodiments, the selection of one of the buttons in estimate maturity metrics frame 820 causes a new estimation to be displayed in the estimated outputs frame 860. The "Time of Estimation" information 830 may indicate at what point of duration in the call the last estimate of a maturity metric was generated. The "Overall Confidence" information 835 may indicate a confidence score determined by the machine learning engine 260 for the most recently estimated maturity metric. In some embodiments, the confidence score is determined by taking an average of each confidence score for estimated age, estimated financial literacy, and estimated education level. Upon selection of "Generate All Maturity Metrics" button 825, the machine learning engine 260 may determine an updated estimation of an age, financial literacy, and education level of an unknown user (e.g., based on additional words and/or phrases detected as the conversation progresses). "Estimate Age" button 840 may cause the machine learning engine 260 to determine an updated age prediction for the unknown user, "Estimate Financial Literacy" button 845 may cause the machine learning engine 260 to determine a new financial literacy prediction for the unknown user, and "Estimate Education Level" button 850 may cause the machine learning engine 260 to determine a new education level for the unknown user. Upon the activation of one of the buttons in the estimate maturity metrics frame 820, an estimation (e.g., estimation 855) may be displayed in the estimated outputs frame 860.

Estimated outputs frame 860 may present the estimated maturity metrics determined by machine learning engine during the advising session. In some embodiments, several estimations may be displayed, with the confidence score of the estimation improving as the advising session takes place and more data on the words and/or phrases used by the customer is acquired by the provider computing system 110 and analyzed by the machine learning engine 260. The recommended products frame 865 may provide a determined (e.g., via recommendation engine 255) product or service for the customer based on the estimated maturity metrics. Recommended products frame 865 may include "Generate New Recommendation" button 870 and "Send Link" button 875. In response to activation of the "Generate New Recommendation" button 870, the recommendation engine 255 may receive the most recently determined maturity metrics from the machine learning engine 260 and generate an updated recommendation based on the most recent maturity metric(s). Upon selection of "Send Link" button 875, a link that may be activated to give information on the recommended product or service may be transmitted to the user device 115 of the customer. In other embodiments, the GUI 800 also includes options to upload and transmit specific documents on the recommended services and/or send a response over text to the user device 115 of the customer.

Figure 9:
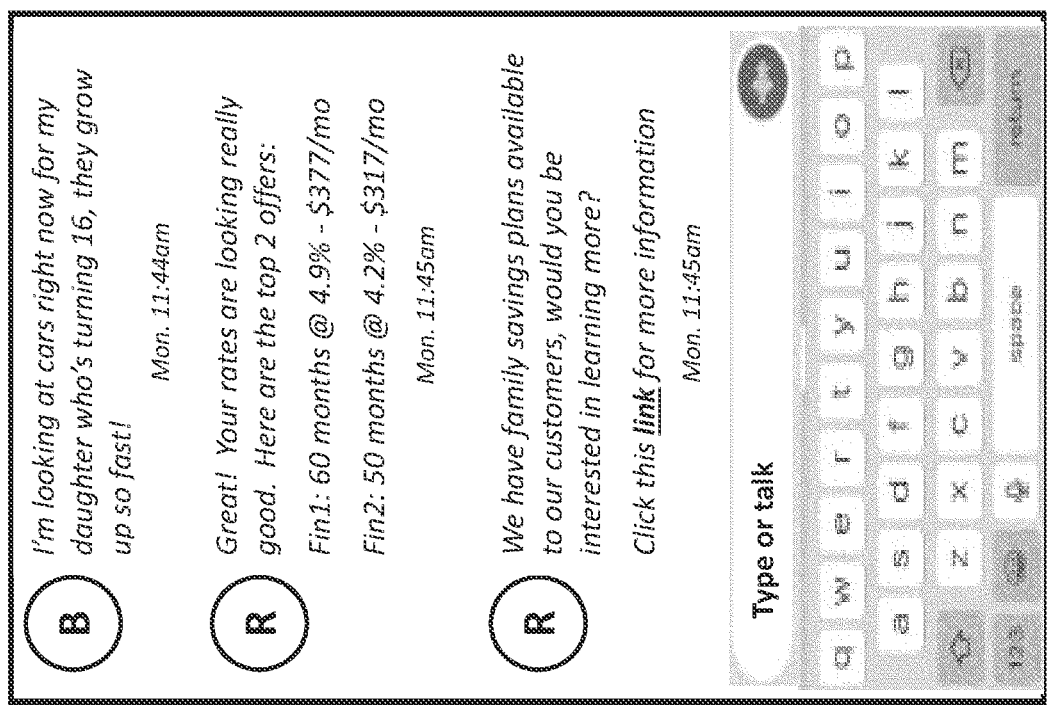
FIG. 9 is an example GUI of a session between a chatbot and a user of a software application where a response is presented based on a determined maturity metric, according to potential embodiments.

Referring now to FIG. 9, a GUI 900 of a session between a chatbot and a user of a software application where a maturity metric can be determined is shown, according to potential embodiments. The GUI 900 may be displayed on a user device 115 associated with a customer. In some embodiments, the GUI 900 displays the messages between the customer interacting with a chatbot (e.g., indicated by the "R" icon). In other embodiments, the messages may be from a user device 115 of a human advisor. The words sent from the customer "my daughter who's turning 16" may be analyzed by the machine learning engine 260 to determine a maturity metric for the customer. For example, the machine learning engine 260 may estimate the age of the customer to be in an age range from 40 to 50 years of age based on the received language data from the text message. Additionally, the recommendation engine 255 may receive the estimated maturity metric from the machine learning engine 260 and the use of the word "daughter" and determine a recommended product for a family savings plan.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
   receiving, by a computing system, a set of words or phrases spoken or written by a user during a conversation with a chatbot executed by the computing system;
   providing, by the computing system, the set of words or phrases as input to a machine learning model trained by applying a supervised machine learning technique to one or more datasets comprising words used during past conversations between the chatbot executed by the computing system and a plurality of users with known maturity metrics, the supervised machine learning technique comprising a pattern recognition model and a classification model applied to the one or more datasets to identify normal patterns of words or phrases used by the plurality of users with the known maturity metrics during the past conversations with the chatbot, the pattern recognition model configured to detect use of certain words or phrases associated with known maturity metrics in the one or more datasets, the classification model configured to classify the plurality of users as corresponding to a predicted maturity metric as indicated by a respective generated confidence value;

determining, by the computing system, that the machine learning model is unable to classify at least one word or phrase in the set of words or phrases;

transmitting, by the computing system to a remote device, responsive to determining that the machine learning model is unable to classify the at least one word or phrase, an indication of the at least one word or phrase that the machine learning model was unable to classify;

providing, by the computing system, the set of words or phrases as input to an updated machine learning model to determine a maturity metric of the user, the updated machine learning model based on an identification of a classification for the at least one word or phrase received in response to the indication transmitted to the remote device, the maturity metric generated with a confidence score indicating an estimated probability that the user corresponds to the maturity metric;

generating, by the computing system, responsive to the confidence score of the maturity metric satisfying a predetermined threshold, a message with a hyperlink for a product or service selected based on the maturity metric of the user; and perceptibly presenting, via the computing system, the message on a client device of the user by sending the message to the client device.

2. The method of claim 1, further comprising:

generating, by the computing system, the one or more datasets comprising words used during past conversations between the chatbot executed by the computing system and the plurality of users with known maturity metrics; and training, by the computing system, the machine learning model by applying the pattern recognition model and the classification model to the one or more datasets.

3. The method of claim 1, further comprising providing, by the computing system, the set of words or phrases as input to an unsupervised clustering model to generate a first maturity confidence score, wherein the set of words or phrases are provided as input to the machine learning model responsive to determining that the first maturity confidence score is less than a second predetermined threshold.

4. The method of claim 1, further comprising generating, by the computing system, the updated machine learning model responsive to receiving a response to the indication that includes the identification of the classification of the at least one word or phrase.

5. The method of claim 4, wherein presenting the response comprises instructing the chatbot to graphically present the response during the conversation.

6. The method of claim 1, further comprising generating, by the computing system, based on the maturity metric of the user and a financial issue identified in the set of words or phrases, a response to the set of words or phrases spoken or written by the user, wherein the message comprises the response.

7. The method of claim 1, wherein the maturity metric is age.

8. The method of claim 1, wherein the maturity metric is financial literacy.

9. The method of claim 1, wherein presenting the response comprises instructing the chatbot to speak the response during the conversation.

10. The method of claim 1, wherein the user accesses the chatbot via the client device in communication with the computing system.

11. The method of claim 1, wherein presenting the response comprises displaying the response on a graphical user interface of a computing device of a human agent for use during the conversation.

12. The method of claim 1, wherein the computing system applies one or more clustering techniques to the one or more datasets and the set of words or phrases to determine an age of the user during the conversation.

13. The method of claim 1, further comprising generating customized responses of the chatbot to the user based on the maturity metric.

14. The method of claim 1, wherein the set of words or phrases comprises colloquial language and jargon spoken by the user during the conversation.

15. The method of claim 1, wherein the machine learning model is further trained to output education levels based on the one or more datasets, and wherein the method further comprises determining an education level of the user during the conversation.

16. The method of claim 13, wherein the machine learning model is further trained using data on speech patterns and grammar.

17. A computer-implemented method, comprising:

determining, by a computing device and during a conversation with a user, that a maturity metric of the user is unknown;

detecting, by the computing device, words or phrases spoken or written by the user during the conversation;

providing, by the computing device, a subset of the words or phrases to a machine learning model trained using a supervised machine learning technique and known maturity metrics to estimate maturity metrics based on words or phrases spoken or written by a plurality of users, wherein the machine learning model is trained by applying a pattern recognition model and a classification model to the words or phrases spoken or written by the plurality of users during past conversations of the plurality of users with a chatbot, the pattern recognition model configured to detect use of certain words or phrases associated with known maturity metrics in the past conversations, the classification model, the classification model configured to classify the plurality of users as corresponding to a predicted maturity metric as indicated by a respective generated confidence value;

determining, by the computing device, that the machine learning model is unable to classify at least one word or phrase in the subset of the words or phrases;

transmitting, by the computing device to a remote device, responsive to determining that the machine learning model is unable to classify the at least one word or phrase, an indication of the at least one word or phrase that the machine learning model was unable to classify;

acquiring, by the computing device, a maturity metric output by an updated machine learning model that was updated based on the at least one word or phrase and an identification of a classification of the at least one word or phrase, the maturity metric generated with a respective confidence score indicating an estimated probability that the user corresponds to the maturity metric;

generating, by the computing device, responsive to the respective confidence score of the maturity metric satisfying a predetermined threshold, a hyperlink for a product or service selected based on the maturity metric of the user;

generating, by the computing device, based on a financial issue identified in the words or phrases spoken or written by the user, a response to the words or phrases that is suited to the maturity metric, the response including the hyperlink; and graphically presenting, by the computing device, the response to the user during the conversation.

18. The computer-implemented method of claim 17, further comprising providing, by the computing device, the subset of the words or phrases as input to an unsupervised clustering model to generate a maturity confidence score, the subset of the words or phrases is provided to the machine learning model responsive to determining that the maturity confidence score is less than a second predetermined threshold.

19. A computer-implemented method, comprising:

capturing, by a user device, using a sound detector of the user device, ambient sounds during a conversation between a user and a chatbot;

analyzing, by the user device, the ambient sounds to recognize a set of words spoken by the user during the conversation;

providing, by the user device, the set of words spoken by the user to a machine learning model trained using at least a supervised machine learning technique on words or phrases previously communicated to the chatbot by multiple other users with known ages, wherein the machine learning model is trained by applying a pattern recognition model and a classification model to the words or phrases spoken or written previously communicated to the chatbot by the multiple other users with known ages, the pattern recognition model configured to detect use of certain words or phrases associated with known ages, the classification model configured to classify the user as corresponding to a predicted age;

determining, by the user device, that the machine learning model is unable to classify at least one word or phrase in the set of words or phrases;

transmitting, by the user device to a remote device, responsive to determining that the machine learning model is unable to classify the at least one word or phrase, an indication of the at least one word or phrase that the machine learning model was unable to classify;

determining, by the user device, an age or an age range of the user by applying the set of words spoken by the user to an updated machine learning model, the age or age range generated with a respective confidence score indicating an estimated probability that the user corresponds to the age or age range, the updated machine learning model updated (i) responsive to receiving a response to the indication that includes an identification of a classification of the at least one word or phrase, (ii) based on the at least one word or phrase and the identification of the classification;

generating, by the user device, responsive to the respective confidence score of the age or age range satisfying a second predetermined threshold, a hyperlink for a product or service selected based on the age or age range of the user;

determining, by the user device, a response to the set of words spoken by the user based on (i) the age or the age range and (ii) a financial issue identified in the set of words spoken by the user, the response including the hyperlink; and generating, by the user device, instructions that cause the chatbot to speak the response during the conversation.

* * * * *